United States Patent [19]
Matsuura et al.

[11] Patent Number: 4,923,653
[45] Date of Patent: May 8, 1990

[54] METHOD OF MOLDING SKIN-COVERED FOAMED PLASTIC ARTICLE

[75] Inventors: Ichiro Matsuura; Kiichiro Ishimaru; Hisayoshi Mizuno; Youichi Omata; Fumio Soutome, all of Kanagawa, Japan

[73] Assignee: Ikeda Bussan Co., Ltd., Ayase, Japan

[21] Appl. No.: 283,853

[22] Filed: Dec. 13, 1988

[30] Foreign Application Priority Data

Mar. 30, 1988 [JP] Japan .................................. 63-74641

[51] Int. Cl.$^5$ .............................................. B29C 67/22
[52] U.S. Cl. ................................. 264/46.6; 264/40.3; 264/46.4
[58] Field of Search ....................... 264/46.6, 403, 46.4

[56] References Cited

U.S. PATENT DOCUMENTS

| | | | |
|---|---|---|---|
| 3,161,436 | 12/1964 | Hood | 264/46.6 |
| 3,487,134 | 12/1969 | Burr | 264/255 |
| 3,534,129 | 10/1970 | Bartel | 264/255 |
| 3,929,948 | 12/1975 | Welch et al. | 264/46.7 |
| 4,025,372 | 5/1977 | Fenton | 264/46.6 |
| 4,060,280 | 11/1977 | Van Loo | 264/46.6 |
| 4,116,736 | 9/1978 | Sanson et al. | 264/46.6 |
| 4,190,697 | 2/1980 | Ahrens | 264/46.6 |
| 4,208,368 | 1/1980 | Egli | 264/45.5 |
| 4,377,609 | 3/1983 | Bartoli et al. | 264/46.6 |
| 4,405,681 | 9/1983 | McEvoy | 264/46.6 |
| 4,544,126 | 10/1985 | Melchert | 264/255 |

FOREIGN PATENT DOCUMENTS

| | | |
|---|---|---|
| 242152 | 10/1987 | European Pat. Off. . |
| 2405666 | 8/1975 | Fed. Rep. of Germany . |
| 3110303 | 10/1982 | Fed. Rep. of Germany . |
| 1383781 | 2/1975 | United Kingdom . |

*Primary Examiner*—Jan H. Silbaugh
*Assistant Examiner*—Allan R. Kuhns
*Attorney, Agent, or Firm*—Foley & Lardner, Schwartz, Jeffery, Schwaab, Mack, Blumenthal & Evans

[57] ABSTRACT

A method of molding a skin-covered foamed plastic article, which includes by steps putting a bag-shaped outer skin member into a cavity of a lower mold, the skin member including an outer layer and a porous inner layer lined on the outer layer; putting a first upper mold on said lower mold to close the cavity; fastening the lower and first upper molds together with a first fastening force; pouring a foamable plastic material into the bag-shaped outer skin member in the cavity and curing the same; removing the first upper mold from the lower mold after the material is hardened to a certain degree; putting a second upper mold on the lower mold to define a given space therebetween; fastening the lower and second upper molds together with a second fastening force which is greater than the first fastening force; and pouring the foamable plastic material into the given space and curing the same.

7 Claims, 1 Drawing Sheet

METHOD OF MOLDING SKIN-COVERED FOAMED PLASTIC ARTICLE

BACKGROUND OF THE INVENTION

1. Field of the Invention

The present invention relates in general to a method of molding a skin-covered foamed plastic article, and more particularly, to a method of molding the foamed article which has certain portions which are different in resiliency.

2. Description of the Prior Art

Hitherto, in the field of seat manufacturing, a so-called "skin-covered foamed plastic pad" has been commonly used as a cushion member of a seat cushion part and/or a seatback part.

One of conventional methods of producing such pad is as follows.

An outer skin member is put into a cavity of a lower mold having a peripheral portion thereof seated on the edge of the cavity of the mold, and then an upper mold is put on the lower mold in a manner to pinch the peripheral portion of the skin member. Then, a foamable liquid material is poured into a bag-shaped outer skin member in the mold and cured in a suitable manner. After the material is hardened to a sufficient degree, the upper mold is removed from the lower mold and a product, viz., the skin-covered foamed plastic article, is took out from the lower mold.

In the seats, particularly the seats for automobiles, it is sometimes required that some portions of the seat have different but desired resiliency for the purpose of providing a seat occupant with a comfortable sitting feeling.

For example, the pad for a buckle type seat is constructed to have a major portion on which the weight of a seat occupant is directly applied and two raised side portions which are arranged at sides of the major portion to stably hold the body of the seat occupant. In fact, the major portion is constructed relatively soft for reliably bearing the weight of the seat occupant, while, the two side portions are constructed relatively hard for obtaining a desired occupant holding performance.

However, in the conventional method as described hereinabove, the production of the relatively hard side portions of the pad has been made by putting foreign things, such as rubber chips or the like, into certain portions of the cavity of the lower mold before pouring the material into the cavity. Furthermore, the resiliency of the side support portions of the pad has been adjusted by controlling the forces of springs which support the side portions. As is known, these steps are difficult or at least troublesome.

SUMMARY OF THE INVENTION

It is therefore an object of the present invention to provide a method of molding a skin-covered foamed plastic article, which is easily carried out.

According to the present invention, there is provided a method of molding a skin-covered foamed plastic article, which method comprises, by steps, putting a bag-shaped outer skin member into a cavity of a lower mold, the skin member including an outer layer and a porous inner layer lined on the outer layer; putting a first upper mold on said lower mold to close the cavity; fastening the lower and first upper molds together with a first fastening force; pouring a foamable plastic material into the bag-shaped outer skin member in the cavity and curing the same; removing the first upper mold from the lower mold after the material is hardened to a certain degree; putting a second upper mold on the lower mold to define a given space therebetween; fastening the lower and second upper molds together with a second fastening force which is greater than the first fastening force; and pouring the foamable plastic material into the given space and curing the same.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
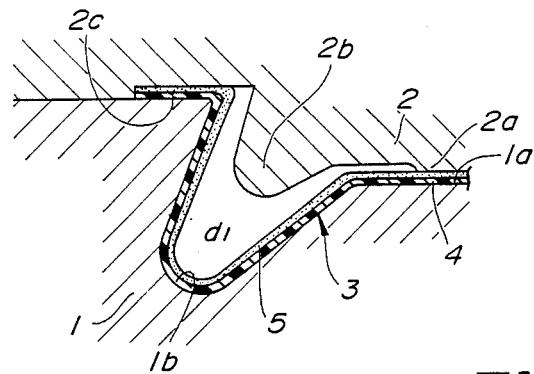
FIGS. 1 to 3 are sectional views of a mold assembly employed in the method of the invention, showing various conditions taken during the molding step for producing a skin-covered pad for a seat cushion.
Figure 2:
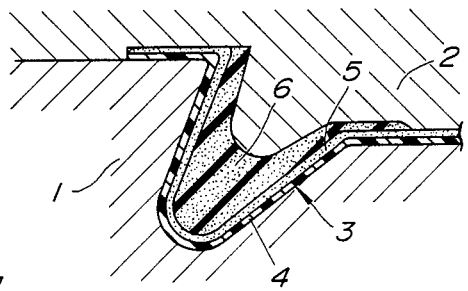
Figure 3:
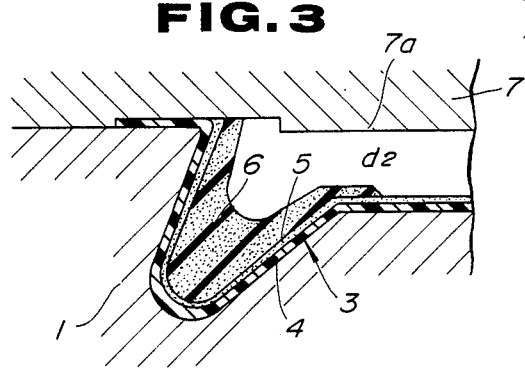

Referring to FIGS. 1 to 3, there are shown the steps for producing a skin-covered foamed plastic pad for a seat cushion. In the drawings, denoted by numeral 1 is a lower mold which has a cavity formed therein, denoted by numeral 2 is a first upper mold and denoted by numeral 7 (see FIG. 3) is a second upper mold. As is seen from FIG. 1, the cavity of the lower mold 1 comprises a shallower major portion 1a and two deeper side portions 1b (only one is shown). The first upper mold 2 comprises two rounded ridges 2b (only one is shown) and a slightly projected center portion 2a. A shallow groove 2c is formed in the upper mold 2, which extends around the ridges 2b. The second upper mold 7 has a slightly projected center portion 7a.

In the following, the steps for molding the skin-covered foamed plastic pad will be described with reference to the drawings.

First, a bag-shaped outer skin member 3 is put into the cavity of the lower mold 1 having a peripheral portion thereof seated on a peripheral edge of the cavity of the lower mold 1. The outer skin member 3 comprises an outer layer 4 made of synthetic leather, natural leather, fabric or the like, and an inner layer 5 made of foamed plastic sheet, such as laminated polyurethane foam, lined on the outer layer 4. The inner layer 5 is of a porous or open cell foam sheet.

Then, the upper mold 2 is properly put on the lower mold 1 in such a manner that the rounded ridges 2b are projected into the deeper side portions 1b of the lower mold 1 leaving considerable spaces "d1" (viz., first cavity) therebetween. It is to be noted that under the proper setting of the upper mold 2 on the lower mold 1, the center portion 2a of the upper mold 2 contacts the skin member 3 and the shallow groove 2c of the same presses the peripheral portion of the skin member 3 against the lower mold 1 as is understood from FIG. 1.

Then, the lower and first upper molds 1 and 2 are fastened to each other by means of a controllable clamp device (not shown).

A liquid material for foamed polyurethane is poured into the cavity "d1" and cured in a known manner. During the curing, the material foams thereby increasing a pressure in the cavity "d1". The clamping by the clamp device is so made as to release an excessive pressure produced in the cavity "d1". Thus, part of the liquid material penetrates into the porous inner layer 5 (viz., wadding) following the gas which discharges, through the porous inner layer 5 and the gas passage thus defined between the two molds 1 and 2, into the open air.

Because the amount of gas discharged from the cavity "d1" is considerable, the amount of the material deposited in the porous inner layer 5 is considerable. Thus, as is understood from FIG. 2, when the curing is completed, a first foamed pad portion 6 is produced with a "hardened" inner layer 5 of the skin member 3 integral therewith.

The first upper mold 2 is removed from the lower mold 1 having the first foamed pad portion 6 left in the lower mold 1, and then the second upper mold 7 is properly put on the lower mold 1 as is shown in FIG. 3.

Then, the lower mold 1 and the second upper mold 7 are fastened with a force greater than the afore-mentioned force provided between the lower mold 1 and the first upper mold 2. With this, there is defined a second cavity "d2" between the two molds 1 and 7.

Then, the foamable material is poured into the second cavity "d2" and cured in a known manner.

Figure 4:
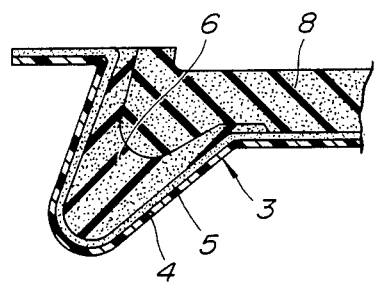
FIG. 4 is a sectional but partial view of the skin-covered pad produced through the method of the present invention.

Thus, part of the material penetrates into the porous inner layer 5 at the center portion exposed to the second cavity "d2". However, since the molds 1 and 7 are tightly fastened as described hereinabove, the gas release from the second cavity "d2" is small and thus the amount of the material deposited in the center portion is small. Thus, as is understood from FIG. 4, when the curing is completed, a second foamed pad portion 8 is produced with a relatively "soft" inner layer 5 of the center portion of the skin member 3 integral therewith.

In the above-mentioned embodiment, the pressure in the cavity is controlled by adjusting the clamping force produced by the clamp device.

If desired, a pressure control passage or passages may be formed in each of the first and second upper molds 2 and 7.

What is claimed is:

1. A method of molding a skin-covered foamed plastic article, comprising by steps:
    (a) putting a bag-shaped outer skin member into a cavity of a lower mold, said skin member including an outer layer and a porous inner layer lining said outer layer;
    (b) putting a first upper mold on said lower mold to close said cavity with a portion of said porous inner layer exposed in said cavity;
    (c) fastening said lower and first upper molds together with a first fastening force;
    (d) pouring a foamable plastic material into said cavity and foaming and curing said material;
    (e) releasing an excessive pressure produced in said cavity during said foaming by discharging gas through said porous inner layer so that part of said material penetrates into said portion of said porous inner layer;
    (f) removing said first upper mold from said lower mold after the material is hardened to a certain degree;
    (g) putting a second upper mold on said lower mold to define a space therebetween with another portion of said porous inner layer exposed in said space;
    (h) fastening said lower and second upper molds together with a second fastening force of a magnitude different from said first fastening force;
    (i) pouring a foamable plastic material into said space and foaming and curing said material; and
    (j) releasing an excessive pressure produced in said space during said foaming by discharging gas through said porous inner layer so that part of said material penetrates into said another portion of said porous inner layer;
    said different fastening forces resulting in discharge of different amounts of gas and penetration of different amounts of material into said portions of said porous inner layer, thereby resulting in said article having certain portions which are different in resiliency.

2. A method as claimed in claim 1, in which said foamable material is a liquid material for foamed polyurethane.

3. A method as claimed in claim 2, in which upon completion of the step (a), a peripheral portion of the skin member is seated on a peripheral edge of the cavity of said lower mold.

4. A method as claimed in claim 3, in which said inner layer is constructed of a laminated polyurethane foam of open cell type.

5. A method as claimed in claim 3, in which upon completion or the step (b), a part of said first upper mold inches said peripheral portion of the skin member.

6. A method as claimed in 2, further comprising, after the step (i), removing said second upper mold from said lower mold after said material is hardened to a certain degree.

7. A method as claimed in claim 2, in which the cavity of said lower mold comprises a shallower major portion and two deeper side portions, said first upper mold comprises two rounded ridges adapted to be projected into said two deeper side portions and a slightly projected center portion adapted to be projected into said shallower major portion, and said second upper mold comprises a slightly projected center portion adapted to be projected into said shallower major portion.

* * * * *